United States Patent [19]

Takeuchi et al.

[11] 4,400,305

[45] Aug. 23, 1983

[54] ADSORBENTS COMPRISING HYDRATED FERRITES OF TI, ZR, AND SN AND CURED THERMOSETTING RESINS

[75] Inventors: Tatsuro Takeuchi, Oumihachiman; Sokukawa Masaki, Takatsuki; Kimoto Ryuzo, Ibaraki, all of Japan

[73] Assignee: Takeda Chemical Industries, Ltd., Japan

[21] Appl. No.: 236,309

[22] Filed: Feb. 20, 1981

[30] Foreign Application Priority Data

Feb. 25, 1980 [JP] Japan .................................. 55/22952
Sep. 11, 1980 [JP] Japan .................................. 55/126945

[51] Int. Cl.³ ...................... B01J 20/26; B01J 39/18; C08K 3/22; B01D 15/04
[52] U.S. Cl. ................................ 252/430; 210/502; 210/670; 210/679; 210/681; 210/683; 523/505; 524/783; 524/784
[58] Field of Search .................. 252/430, 62.54; 210/502; 428/307.3, 329; 523/505; 524/783, 784

[56] References Cited

U.S. PATENT DOCUMENTS

| 2,211,664 | 7/1980 | Dixon et al. | 210/502 |
| 4,144,373 | 3/1979 | Weiss et al. | 252/430 |
| 4,187,187 | 2/1980 | Turbeville | 252/62.54 |
| 4,362,626 | 12/1982 | Takevchi et al. | 252/430 |

FOREIGN PATENT DOCUMENTS

55-13153 1/1980 Japan .

OTHER PUBLICATIONS

Kirk–Othmer Encyclopedia of Chemical Technology, Second Edition—vol. 8—pp. 892-895

Primary Examiner—P. E. Konopka
Attorney, Agent, or Firm—Wenderoth, Lind & Ponack

[57] ABSTRACT

An adsorbent, which has been prepared by mixing (a) one part by weight of (i) at least one member selected from the group consisting of hydrated ferrites of titanium, zirconium and tin or (ii) a mixture of the said hydrated ferrites(s) and at least one member selected from the group consisting of hydrated oxides of titanium, zirconium, tin and iron with (b) about 1/10 to 3 parts by weight of a thermosetting resin showing resistance to acids and alkalis such as an unsaturated polyester or polyurethane resin, followed by curing.

The adsorbent can be used to adsorb a great variety of anions and cations and especially as an adsorbent for phosphate ions.

The adsorbent shows excellent resistance to acids and alkalis, and can be subjected to repeated desorption and regeneration procedures without causing any deterioration of its adsorptive capacity, thus permitting its repeated usage over a long period of time.

The adsorbent can be magnetically separated, and facilitates solid-liquid separation.

3 Claims, 2 Drawing Figures

PH of an aqueous solution containing phosphate ions

Fig. 1

Fig. 2

ADSORBENTS COMPRISING HYDRATED FERRITES OF TI, ZR, AND SN AND CURED THERMOSETTING RESINS

This invention relates to adsorbents which exhibit excellent mechanical strength and adsorption capacity and which may be produced more economically.

In recent years, eutrophication in confined bodies of water such as the Inland Sea and the Lake Biwa has been increasing steadily, thus bringing about a major social problem. In particular, the removal of phosphate ions, which cause, inter alia, such eutrophication, has become an important problem urgently requiring a solution.

The so-called flocculation sedimentation method, which is considered the sole industrial method among the currently developed techniques for the removal of phosphate ions from water, comprises the addition of a chemical reagent containing ions of metals such as calcium and aluminum to waste water containing phosphate ions, in order to remove the phosphate ions as sparingly soluble phosphates.

Nevertheless, this method, which produces large quantities of sludge, and a possibility of secondary environmental polution, is not necessarily regarded as a satisfactory one, and the development of a novel technique for overcoming this defect has been increasingly desirable.

Hydrates of titanium oxide, zirconium oxide and tin oxide possess the property of ion exchange and, for example, in acidic solutions, through the fixing of $H^+$, become anion exchangers with the capacity for adsorbing phosphate ions, fluoride ions, sulfate ions, chloride ions, arsenate ions, arsenite ions, chromate ions, molybdate ions, etc.

It has also long been known that in an alkaline solution, they function as cation exchangers adsorbing $UO_2^+$ etc. through the fixing of $OH^-$.

The present inventors, while taking notice of the ion exchange property of these metal oxide hydrates, have carried out development work on adsorbents. As a result, it has been found out that production of adsorbents utilizing metal oxide hydrates alone inevitably leads to increased costs of the resulting adsorbents because both zirconium and titanium are relatively expensive metals, manufacture of adsorbents with use of precipitates of these metal oxide hydrates presenting many problems connected with the manufacturing process such as prolonged time required for the filtration treatment, and further that the adsorbents as produced by the above procedures, with their deteriorated mechanical strength, have the fatal disadvantage of failing to withstand the industrial application conditions.

The present inventors, as a result of further research, found that the adsorbents obtained by mixing at least one member of hydrated ferrites of titanium, zirconium and tin or a mixture of the said hydrated ferrite(s) and at least one member of hydrated oxides of titanium, zirconium, tin and iron with an unsaturated polyester or polyurethane resin, followed by curing, exhibit excellent mechanical strength and adsorption capacity and may be produced more economically, and, on the basis of these findings, have come to complete this invention.

According to one aspect of this invention, there is provided an adsorbent, which has been prepared by mixing (a) one part by weight of at least one member selected from the group consisting of hydrated ferrites of titanium, zirconium and tin or a mixture of the said hydrated ferrite(s) and at least one member selected from the group consisting of hydrated oxides of titanium, zirconium, tin and iron with (b) about 1/10 to 3 parts by weight of a thermosetting resin showing resistance to acids and alkalis such as an unsaturated polyester or polyurethane resin, followed by curing.

At least one member of hydrated ferrites of titanium, zirconium and tin or a mixture of the said hydrated ferrite(s) and at least one member of hydrated oxides of titanium, zirconium, tin and iron, which is utilizable in the production of the adsorbents of this invention, can be produced, for example, by the following procedure.

To a solution containing metal ions prepared by dissolving at least one member of metal salts of titanium, zirconium and tin is added a ferrous salt of the amount equivalent to about 0.2 to 11 times the molar quantity of the metal ions contained in the solution, followed by adding an alkali to maintain the pH of the solution at about 6 or above, preferably about 7 to 12. Then, after increasing the temperature of the solution up to about 30° to 100° C., if necessary, an oxygen gas or an oxidizing gas such as ozone is blown in or an oxidizing agent such as hydrogen peroxide is added to thereby produce a precipitate of a hydrated ferrite.

The resulting precipitate is filtered out, washed with water and then dried. Drying is carried out by means of air-drying or at not higher than about 100° C., preferably not higher than about 50° C., for about 1 to 20 hours. The water content after drying preferably falls within the range of about 6 to 30 weight %.

By the above procedure, at least one member of hydrated ferrites of titanium, zirconium and tin or its mixture with at least one member of hydrated oxides of titanium, zirconium, tin and iron is obtained.

More specifically, at least one member of hydrated ferrites of titanium, zirconium and tin or its mixture with hydrated iron oxide is produced in the same manner as the above-mentioned procedure except for adding to a solution containing metal ions prepared by dissolving at least one member of metal salts of titanium, zirconium and tin a ferrous salt of the amount equivalent to about 2 to 11 times the molar quantity of the metal ions contained in the solution.

The term, hydrated iron oxide, as used herein, designates hydrates (monohydrates, dihydrates, trihydrates, tetrahydrates, etc.) of iron oxides such as FeO, $Fe_2O_3$ and $Fe_3O_4$. A ratio of a hydrated ferrite to a hydrated iron oxide such that the hydrated ferrite may occupy about 24 to 100 weight %.

A mixture consisting of at least one member of hydrated ferrites of titanium, zirconium and tin and at least one member of hydrated oxides of titanium, zirconium and tin is produced in the same manner as the above-mentioned procedure except for adding to a solution containing metal ions prepared by dissolving at least one member of metal salts of titanium, zirconium and tin a ferrous salt of the amount equivalent to not less than about 0.2 times, but less than about twice, the molar quantity of the metal ions contained in the solution. In this case, the content of a hydrated ferrite is in the range of not less than about 20 weight % but less than about 100 weight %.

The term, "hydrated titanium oxide", as used herein, denotes compounds represented by the general formula of $TiO_2 \cdot nH_2O$ (wherein n is a positiv number of 0.5 to 2.0). Specifically, there may be mentioned, for example, $TiO_2 \cdot H_2O(TiO(OH)_2)$, $TiO_2 \cdot 2H_2O(Ti(OH)_4)$, $TiO_2 \cdot n$-

$H_2O$(n=1.5 to 2.0), etc. The term, "hydrated zirconium oxide", denotes compounds represented by the general formula of $ZrO_2.nH_2O$ (wherein n is a positive number of 0.5 to 2.0). Specifically, there may be mentioned $ZrO_2.H_2O(ZrO(OH)_2)$, $ZrO_2.2H_2O(Zr(OH)_4)$, $ZrO_2.nH_2O$(n=1.5 to 2.0), etc. The expression, "hydrated tin oxide", means compounds represented by the general formula of $SnO_2.nH_2O$ (wherein n is a positive number of 0.5 to 2.0). Specifically, there may be mentioned $SnO_2.H_2O(SnO(OH)_2)$, $SnO_2.2H_2O(Sn(OH)_4)$, $SnO_2.nH_2O$(n=1.5 to 2.0), etc.

Examples of metal salts of titanium, zirconium or tin, which may be useful in the above-mentioned production procedures, include titanium tetrachloride ($TiCl_4$), titanium sulfate ($Ti(SO_4)_2$), zirconium oxychloride ($ZrOCl_2.8H_2O$), zirconium tetrachloride ($ZrCl_4$), zirconium nitrate ($Zr(NO_3)_4.4H_2O$), zirconium sulfate ($Zr(SO_4)_2.4H_2O$), zirconium acetate ($Zr(CH_3COO)_4$), tin tetrachloride ($SnCl_4$), tin nitrate ($Sn(NO_3)_4$), tin sulfate ($Sn(SO_4)_2$), etc. These metal salts are normally added as an about 0.05 to 2.0 mole % solution.

As examples of the ferrous salt, there may be mentioned ferrous sulfate ($FeSO_4.7H_2O$), ferrous nitrate ($Fe(NO_3)_2.6H_2O$), ferrous chloride ($FeCl_2$) etc. These ferrous salts are normally added as solid masses but may be added as a solution.

As examples of the alkali, there may be mentioned sodium hydroxide, potassium hydroxide, calcium hydroxide, ammonia, sodium carbonate, etc. These are normally utilized in a state of an about 5 to 20 weight % aqueous solution.

In the case of blowing in an oxidizing gas, the duration of time varies depending upon the type of oxidizing gases and is normally in the range of about 1 to 3 hours.

As the oxidizing agent, use is made of hydrogen peroxide, sodium hypochlorite, potassium hypochlorite, etc.

The hydrated ferrite or its mixture with a hydrated oxide may be in any form and, preferably in the form of particles with a particle size of not larger than about 250$\mu$, in terms of processability of mixing with a resin, adsorption capacity, etc. as mentioned hereinafter.

In this invention, the hydrated ferrite or its mixture with a hydrated oxide as obtained is mixed with an unsaturated polyester or polyurethane resin of about 1/10 to 3, preferably about 1/5 to 1 times the amount (weight) thereof.

In cases in which the amount of the above-mentioned resin is in excess of about 3 times that of the hydrated compound, the resultant adsorbent exhibits increased mechanical strength but deteriorated adsorption capacity. In the case of the proportion of the resin being reduced to less than about 1/10 of that of the hydrated compound, the resultant adsorbent is good in adsorption capacity but of decreased mechanical strength, leading in some instances to failure to withstand industrial application.

The unsaturated polyester resin, which is used in the production of the adsorbent of this invention, may be any known unsaturated polyester resins and, specifically, includes solutions in vinylic monomers, such as styrene, chlorostyrene, methyl methacrylate and diallyl phthalate, of linear unsaturated polyester resins obtained by condensing by known procedures dicarboxylic acids having a double bond in the molecule, e.g. maleic acid or its anhydride and fumaric acid, with divalent alcohols, e.g. ethylene glycol and propylene glycol. The above-mentioned dicarboxylic acids may be modified with unsaturated and saturated dicarboxylic acids such as fumaric acid, itaconic acid, phthalic anhydride, adipic acid, Het acid, sebacic acid, isophthalic acid and terephthalic acid. Also, the divalent alcohols may be modified with glycols such as bisphenol A, hydrogenated bisphenol A, butane diol, diethylene glycol, dipropylene glycol, triethylene glycol, trimethylene glycol, hexanediol and pentanediol.

As the polyurethane resin, use is made of any known polyurethane resins, and there may be specifically mentioned the resins obtained by reacting polyols having not less than 2 hydroxyl groups in the molecule, e.g. polyether polyols, polyester polyols, polymer polyols, butadiene based polyols, polycarbonate diols and castor oil, with polyisocyanates having not less than two isocyanate groups in the molecule, e.g. tolylenediisocyanate (TDI), diphenylmethane diisocyanate (pure MDI), naphthalenediisocyanate (NDI), dimethyldiphenyldiisocyanate (TODI), polymethylenepolyphenylpolyisocyanate (crude MDI), xylylenediisocyanate (XDI), hexamethylenediisocyanate (HMDI) and isophoronediisocyanate (IPDI). The polyurethane resins, normally, cure to thermosetting resins by the reaction among the isocyanate groups contained in the resin to be initiated by heat or crosslinking agent or the reaction of such groups with ethylene glycol, propylene glycol, butanediol, glycerine, hexanetriol, trimethylolpropane, water, etc.

The above-mentioned unsaturated polyester or polyurethane resin, when it is liquid at room temperature, can be directly utilized, but, in the case of it being solid, is converted into a liquid form by adding hydrocarbons such as butane, hexane, cyclohexane, benzene and toluene, halogenated hydrocarbons such methylene chloride, chloroform, trichloroethane and chlorobenzene, alcohols such as methanol, ethanol and propanol, ketones such as acetone and methyl ethyl ketone, esters such as methyl acetate and ethyl acetate, ethers such as ethyl ether, dioxane and tetrahydrofuran, and other organic solvents or mixtures thereof, or heating at not higher than 90° C., etc.

As the specific procedure of mixing with the unsaturated polyester or polyurethane resin, there may be mentioned, for example, mixing by high-speed agitation of the hydrated ferrite or its mixture with the hydrated oxide and the resin in a vessel equipped with an agitor, a batch-wise or continuous mixing by means of a mixing apparatus, and a batch-wise or continuous mixing by use of an appratus utilized for the solid-liquid mixing. In carrying out the mixing, a catalyst such as benzoyl peroxide (BPO), lauroyl peroxide, acetyl peroxide, methyl ethyl ketone peroxide, t-butyl peroxide isobutyrate, etc. as well as a curing accelerator such as cobalt naphthenate, manganese naphthenate, dimethylaniline, phenylmorpholine, diethanolaniline, vanadyl acetylacetonate, phenylphosphinic acid, etc. may be added to the unsaturated polyester resin in appropriate quantities, if necessary.

After mixing with the resin, the mixture is allowed to cure. The curing procedure is normally conducted into practice at room temperature, but may be effected under heating at about 30° to 90° C., in the case where room temperature curing time is undersirably slow. The cured mixture if necessary, may be crushed by means of a hammer mill, roll crusher, etc. so as to sieve to a given particle size range. In such case, the particle size in the range of about 3 to 120 mesh, preferably in the range of about 24 to 80 mesh, is desired. Alternatively, the mixture may be extruded into a cylindrical form and transferred to equipment such as a steel belt conveyor to thereby provide sufficient residence time to allow the mixture to cure on the steel belt conveyor, followed by cutting the cured, cylindrical-formed adsorbent to a suitable length.

In addition, a spherical-formed adsorbent may be prepared by use of a saucer-type rolling granulating machine or centrifugal fluidized coating-granulating machine with fine paricles of the mixture as a nucleus by simultaneously supplying the hydrated ferrite, etc. and the liquid resin to carry out a coating granulation.

The adsorbent obtained by any of the methods described can be used as an adsorbent for a great variety of anions such as phosphate ions, fluoride ions, chloride ions, nitrate ions, sulfate ions, chromate ions and arsenite ions in various acidic solutions, for a variety of cations such as lithium ions, sodium ions, potassium ions, rubidium ions, cesium ions or the like, in various alkaline solutions. It is particularly useful as an adsorbent for phosphate ions, because it adsorbs selectively phosphate ions in an acidic solution within the pH range of about 1.5 to 5.

If a solution containing phosphate ions is alkaline, pH of the solution may be adjusted to an acid reaction by the addition of an inorganic acid such as sulfuric acid, hydrochloric acid, nitric acid etc. When the solution is acidic, an alkali such as sodium hydroxide, potassium hydroxide, ammonium hydroxide, sodium carbonate, potassium carbonate etc. may be used to adjust the pH to a required value.

The content of phosphate ions in the solution is not critical but is preferably within the range of about 0.1 to 10,000 ppm.

The procedure for allowing the adsorbent to come into contact with a solution containing phosphate ions may be, for example, (a) a fixed bed adsorption process, (b) a moving bed adsorption process, (c) a fluidized-bed adsorption process (d) an addition process of an adsorbent to the solution containing phosphate ions etc.

The contact of the adsorbent with the solution containing phosphate ions may be carried out either in a batch-wise or in a continuous operation.

According to process (a), a solution containing phosphate ions is fed into the top or bottom of the column packed with an adsorbent. Two or more columns may be provided. The contact is maintained at all times in at least one column, while in the remaining column(s) the adsorbent is regenerated or replaced.

According to process (b), a solution containing phosphate ions is fed from the bottom of the column packed with the adsorbent counter-current to the adsorbent. The treated solution is discharged from the top of the column.

According to process (c), a solution containing phosphate ions is fed into the bottom of a column packed with an adsorbent so as to form a fuidized bed of the adsorbent. The treated solution is discharged from the top of the column.

According to process (d), the adsorbent is added to a solution containing phosphate ions placed in a tank. With stirring, the phosphate ions are efficiently adsorbed.

The solution is separated from the adsorbent by means conventional per se, such as filtration, sedimentation and centrifugal separation etc.

In general, the adsorbent having adsorbed anions or cations is treated with a solution of an alkali or acid, respectively, to liberate the anion or cation into the solution.

In this case, the adsorbent having adsorbed phosphate ions liberates the ions into the aqueous solution by treating with an aqueous solution of an alkali.

The alkali may be, for example, sodium hydroxide, potassium hydroxide, ammonium hydroxide and sodium carbonate etc. but is preferably sodium hydroxide. The pH of the aqueous solution of the alkali is preferably not less than about 8, and most preferably not less than about 10.

The alkali content in the aqueous solution is within the range of about 1 to 30 weight %.

When sodium hydroxide is used as an alkali, and the adsorbent had adsorbed phosphate ions, the adsorbent liberates the phosphate ions into solution in the form of sodium phosphate, so that regeneration of the adsorbent may be accompanied by the recovery of an aqueous solution containing sodium phosphate. The concentration of sodium phosphate in the aqueous solution thus recovered is generally very low and is generally within the range of about 1.5 to 12% by weight. For crystallizing sodium phosphate from the solution, the procedure generally employed is that of concentrating the solution by evaporation to an oversaturated state, allowing crystals of sodium phosphate to precipitate.

In view of this disadvantage of the conventional procedure, it become necessary to seek a less expensive alternative.

We have found that the addition of solid sodium hydroxide or of a concentrated solution of, for example, not less than 20% by weight of sodium hydroxide to a sodium phosphate solution, causes the sodium phosphate to precipitate efficiently in the form of crystals.

Figure 1:
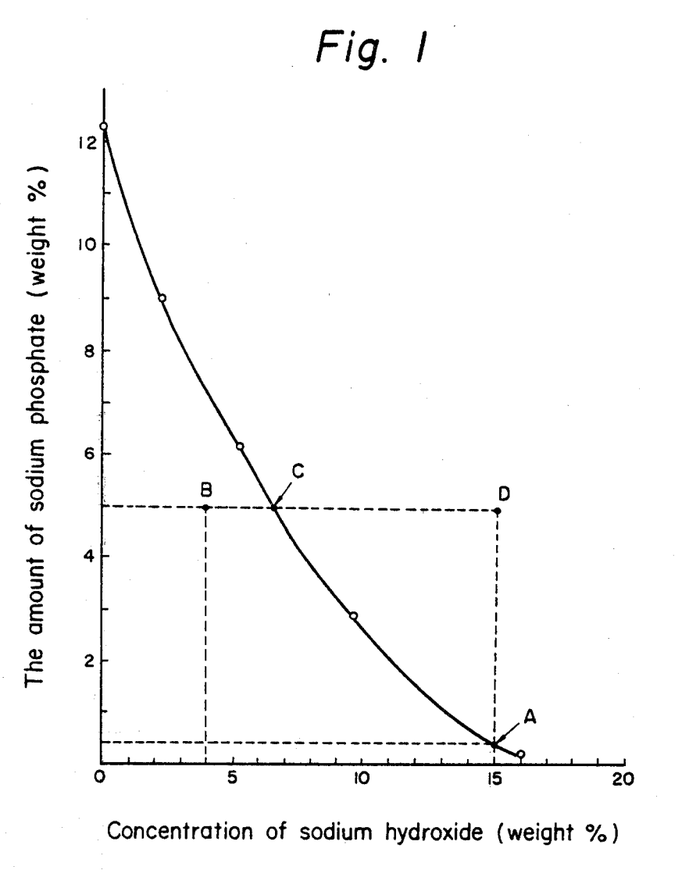

The quantity of sodium hydroxide to be added to precipitate sodium phosphate from a solution of a given concentration thereof may be derived from the accompanying drawing FIG. 1 which is a plot of the concentration of an aqueous solution of sodium hydroxide (along the horizontal axis) against the maximum amount of sodium phosphate dissolving in the sodium hydroxide solution (along the vertical axis) at 25° C.

As is obvious from the drawing, maximum amount of sodium phosphate dissolving in an aqueous solution of sodium hydroxide varies with the concentration of sodium hydroxide present in the aqueous solution; that is to say, about 12.4% by weight of sodium phosphate dissolves in water which is free of sodium hydroxide whereas only 0.4% by weight of sodium phosphate is soluble in an aqueous solution containing 15% by weight of sodium hydroxide (point A). For example, the point B in the drawing indicates a diluted solution of sodium phosphate with a sodium phosphate content of 5% by weight containing 4% by weight of sodium hydroxide; in this case, in order to precipitate out sodium phosphate in the form of crystals, sodium hydroxide either in the solid form or a concentrated solution is added until the sodium hydroxide concentration reaches about 6.4% by weight (point C), when sodium hydroxide is further added up to a concentration of about 15% by weight (point D), the content of dissolved sodium phosphate at this sodium hydroxide concentration is about 0.4% by weight, and, assuming that the diluted solution of sodium phosphate weighs 100 g, 4.6 g. of sodium phosphate will have precipitated.

This quantity can be calculated using the initial (5%) and final (0.4%) concentration of sodium phosphate as follows:

$$100 \text{ g} \times (5/100 - 0.4/100).$$

The above-mentioned procedure of allowing crystals of sodium phosphate to precipitate according to the drawing is conducted at 25° C., and such procedure is normally conducted at a temperature within the range of about 10° to 30° C. Even in cases where temperature and concentration conditions are different from those described above, the procedure is substantially the same in principle.

Sodium phosphate thus precipitated can be separated easily by means conventional per se, such as filtration and centrifugal separation etc.

The crystals of sodium phosphate obtained in this manner are of a high purity. Moreover, the mother liquor resulting from separation of crystals of sodium phosphate, exhibiting a very small content of sodium phosphate and containing normally about 5 to 20% by weight of sodium hydroxide, can be recycled for use, for example, in the procedure of regenerating adsorbents having adsorbed phosphate ions.

According to the procedure described above, sodium phosphate can be recovered in the crystalline form at reduced cost as compared with the conventional evaporation procedure. Furthermore, recovery of sodium phosphate from an extremely diluted solution is quite possible.

The adsorbent of this invention with its excellent mechanical strength, can withstand conditions of the industrial application, and can be applied not only to a fixed-bed adsorption apparatus but also moving-bed and fluidized-bed adsorption apparatus in carrying out the adsorption procedure. Moreover, it is also excellent in the resistance to chemicals such as acids and alkalis and can be subjected to repeated desorption and adsorption procedures without any deterioration, thus permitting repeated use for a prolonged period of time. Particularly, the hydrated ferrite has the crystal lattices of the stable compound formed, whereby the titanium, zirconium or tin atoms are supposed to enter into the positions to be occupied by the iron atoms of the lattices composed of the added ferrous salt to thereby form a solid solution, and such metals are stable, offering the advantage of improved elution-resistance.

Furthermore, the adsorbent of this invention can be magnetically separated, and facilitates easily solid-liquid separation for adsorbents. Besides, the adsorbent of this invention is produced by the simplified procedure of mixing simply a hydrated ferrite or its mixture with a hydrated oxide with an unsaturated polyester or polypolyurethane resin, followed by allowing the mixture to cure, thus providing the advantage of reduced production costs.

This invention will now be more particularly described in the following Examples, wherein the term "%" means "% by weight" and the term "SV" means "space velocity".

EXAMPLE 1

One liter of an 0.15 mol aqueous solution of titanium tetrachloride was prepared. 7 gr. as Ti of metal ions was contained in the solution. 84 gr. of crystals of ferrous sulfate ($FeSO_4.7H_2O$) was added to the solution and dissolved with stirring. The quantity was equivalent to 0.3 mol as ferrous ion. Then, a 15 weight % sodium hydroxide solution was added dropwise to the solution with stirring, whereby a blue-green precipitate was produced. The drop-wise addition was continued until the pH of the aqueous solution reached 10. In the next place, air was blown into the aqueous solution at a flow rate of 10 l/hour, while warming the solution at 60° to 70° C. Continued air blowing brought about a decreased pH of the aqueous solution and, in such case, the pH was maintained at 10 by adding a 15% sodium hydroxide solution. Air was blown for about 2 hours to thus produce a black-colored precipitate of hydrated ferrite of titanium. Tha black-colored precipitate was filtered off by suction and washed with deionized water until the filtrate became neutral, followed by drying at not higher than 70° C. The precipitate was pulverized to a particle size of not larger than 120 microns in a mortar to produce powder of hydrated ferrite of titanium. 20 gr. of the powder of hydrated ferrite of titanium was weighed out in a beaker, to which 20 gr. of an isophthalic-acid-maleic acid-propylene glycol based unsaturated polyester (softening point; about 95° C.) dissolved in styrene (62 weight parts per hundred resin) was added to agitate and mix adequately with a stirring rod. Then, 0.1 gr. of cobalt naphthenate and 0.2 gr. of methyl ethyl ketone peroxide were added and mixed adequately to allow the resin to cure. A curing time was about 30 to 60 minutes. The cured mass was taken out of the beaker, pulverized to a suitable size, and sieved to a particle size of 8 to 32 mesh to obtain an adsorbent.

EXAMPLE 2

One liter of a 0.05 mol aqueous solution of zirconium oxychloride was prepared. 4.55 gr. as Zr of metal ions was contained in the solution. 27.8 gr. of crystals of ferrous sulfate ($FeSO_4.7H_2O$) was added to the aqueous solution and dissolved with stirring. The quantity was equivalent to 0.1 mol as iron ion. Then, a 15% sodium hydroxide solution was added dropwise to the aqueous solution under stirring, until pH of the solution reached 11, whereby there was produced a blue-green precipitate. Subsequently, air was blown into the aqueous solution at a flow rate of 10 l/hour, while warming the solution at 50° to 80° C. Continued air blowing brought about a decreased pH of the aqueous solution and, in such case, pH was maintained at 10 by adding a 15% sodium hydroxide solution dropwise. Air was continued to be blown until there was no lowering observed in pH, whereby there was produced a black-colored precipitate of hydrated ferrite of zirconium. Next, the black-colored precipitate was filtered off by suction, washed with deionized water until the filtrate became neutral, and dried then at not higher than 50° C. The precipitate was pulverized to not larger than 120 micron in a mortar to make powder of hydrated ferrite of zirconium. Then, 10 gr. of the powder of hydrated ferrite of zirconium was weighed out in a beaker. Subsequently in the same manner as in Example 1, 10 gr. of the unsaturated polyester resin used in Example 1 was mixed with it and allowed to cure to thus obtain an adsorbent.

EXAMPLE 3

A 14 gr. portion of the powder of hydrated ferrite of zirconium as produced in Example 2 was weighed out in a beaker, and, subsequently by the same procedure as in Example 1, 6 gr. of the unsaturated polyester resin used in Example 1, together with 0.03 gr. of cobalt naphthenate and 0.06 gr. of methyl ethyl ketone peroxide, was added, and agitated and mixed adequately, followed by allowing the mixture to stand to thus complete curing within 60 minutes. The cured mass was crushed to a suitable size and sieved to a particle size of 8 to 32 mesh to obtain an adsorbent.

EXAMPLE 4

A 1 l portion of a 0.05 mol aqueous solution of zirconium oxychloride was prepared. 4.55 gr. as Zr was contained in this solution. 153 gr. of crystals of ferrous sulfate ($FeSO_4.7H_2O$) was added to the aqueous solution and dissolved with stirring. The quantity was equivalent to 0.55 mol as iron ion. Then, a 15 weight % sodium hydroxide solution was added dropwise to the aqueous solution with stirring until pH of the solution reached 9.5, whereby there was produced a blue-green precipitate. Subsequently, air was blown into the aqueous solution at a flow rate of 10 l/hour, while warming it at 40° to 70° C. Continued air blowing brought about a decreased pH of the aqueous solution and, in such case, pH was maintained at 10 by adding a 15% sodium hydroxide solution dropwise. Air was continued to be blown until there was no lowering observed in pH, whereby there was produced a black-colored precipitate of a mixture of hydrated ferrite of zirconium and hydrated iron oxide. The precipitate contained about 27% of hydrated ferrite of zirconium. Subsequently, it was treated in the same manner as in Example 1, thus yielding an adsorbent.

EXAMPLE 5

By the same procedure as in Example 2, there was obtained 16 gr. of powder of hydrated ferrite of zirconium. Then, 7 gr of a bisphenol-A-propylene oxide-fumaric acid based unsaturated polyester (softening point; about 100° C.) dissolved in styrene (100 weight parts per hundred resin) was added to the powder and, agitated and mixed adequately. 0.035 gr. of a 1 weight % cobalt naphthenate solution and 0.07 gr. of methyl ethyl ketone peroxide, further with 0.007 gr. of dimethylaniline, were added to the mixture, and mixed adequately under a stream of nitrogen gas to allow to cure. A curing time was 35 to 45 minutes. The solid mass as obtained in this manner was pulverized and sieved, thus yielding an adsorbent of 8 to 32 mesh.

EXAMPLE 6

By the same procedure as in Example 2, there was obtained 16 gr. of powder of hydrated ferrite of zirconium. 10 ml (about 10 gr.) of a hydrophilic urethane prepolymer (a hydrophilic polyether polyol of a copolymer from ethylene oxide and propylene oxide being added with tolylenediisocyanate at its terminals) was added dropwise under stirring, while suspending the powder in 10 ml of water. The reaction of the hydrophilic urethane prepolymer with water began to take place immediately, and afforded a foaming gel of the polyurethane resin under evolution of carbonic acid gas. The powder of hydrated ferrite of zirconium was dispersed and held in the gel. The gel was cut to a suitable size to obtain an adsorbent.

EXAMPLE 7

The adsorbent obtained in Example 2 was pulverized to obtain the powder passing through a 200-mesh sieve. Then, the above-mentioned powdered adsorbent of the quantities as described in the below table was added to 100 ml (pH=3) of model waste water containing 500 ppm of phosphate ions as prepared by use of sodium hydrogenphosphate, and the mixture was shaken for one day (24 hours) to measure a phosphate ion concentration in the model waste water. Determinations of amounts of phosphate ions adsorbed by the adsorbents are given Table 1, where the adsorbed amounts of activated alumina conventionally known as an adsorbent for phosphate ions are also indicated.

TABLE 1

| Exp. No. | Adsorbent | Quantity added (gr.) | $PO_4$ concentration (mgl/l) Before adsorption | $PO_4$ concentration (mgl/l) After adsorption | Amount of adsorbed $PO_4$ (mg./g) |
| --- | --- | --- | --- | --- | --- |
| 1 | Adsorbent of Example 2 | 0.2 | 500 | 268 | 116 |
| 2 | Adsorbent of Example 2 | 0.3 | 500 | 170 | 110 |
| 3 | Adsorbent of Example 2 | 0.5 | 500 | 10 | 98 |
| 4 | Commercially available activated alumina | 0.8 | 500 | 50 | 56 |

EXAMPLE 8

The adsorbent obtained by the same procedure as in Example 3 was pulverized and sieved to 32 to 60 mesh and 10 gr. (about 14 ml) thereof was packed into a column of 10 mm $\phi$ in inner diameter, through which the model waste water (as adjusted to pH 4 with dilute sulfuric acid) containing 300 ppm of phosphate ions as prepared by use of sodium hydrogen-phosphate was passed at a flow rate of SV=3 (l/hr). Sampling was made from effluent solutions from the column at constant intervals to measure the phosphate ion concentrations. The results are shown in Table 2.

TABLE 2

| Volume of waste water passed (l) | Column volume through which waste water passed (times) | Concentration of phosphate ions in effluents (mg./l) |
| --- | --- | --- |
| 0 | — | — |
| 0.5 | 50 | 3 |
| 1.0 | 100 | 10 |
| 1.5 | 150 | 16 |
| 2.0 | 200 | 25 |
| 2.5 | 250 | 80 |

The quantity of adsorbed phosphate ions by the adsorbent, found after having passed 2.5 l through the column, was about 65 mg. $PO_4$/g-adsorbent. When 30 ml of a 15% NaOH solution was passed through the column at a rate of SV=1 (l/hr), it was found out that about 95% of adsorbed phosphate ions was desorbed.

EXAMPLE 9

The adsorbent as obtained by the same procedure as in Example 3 was pulverized and sieved to 8 to 32 mesh, and 20 gr. (about 30 ml) was packed into a column of 16 mm $\phi$ in inner diameter, through which 5 l of the activated sludge treatment water adjusted to a phosphate ion content of 380 ppm was passed at a flow rate of SV=2 (l/hr). The quantity of adsorbed phosphate ions by the adsorbent, found after having passed 5 l through the column, was about 52 mg $PO_4$/g-adsorbent. When 40 ml of a 15% NaOH solution was passed through the column, at a flow rate of SV=1 (l/hr), it was found out that about 94% of adsorbed phosphate ions was desorbed. 40 ml of a 2% $H_2SO_4$ solution was passed through the adsorbent subjected to desorption at a rate of SV=10 (l/hr) to regenerate and, 5 l of the activated sludge treatment water flowed through it in the same conditions as the above-mentioned. In this manner, the repeated use was continued. The results are shown in Table 3.

TABLE 3

| Number of repeated passing-through (times) | Adsorbed quantity after 5 passed through (mg.PO4/g-adsorbent) |
| --- | --- |
| 1 | 52 |
| 10 | 50 |
| 20 | 53 |
| 30 | 48 |
| 50 | 49 |

As may be obvious from the above table, it was found out that the adsorbent of this invention had been repeatedly used 50 times substantially without deterioration in its adsorption capacity.

EXAMPLE 10

A 2 weight % $H_2SO_4$ solution or 2% NaOH solution was added to a test solution containing 500 ppm of phosphate ions as prepared by use of sodium hydrogenphosphate to prepare 100 ml of the model waste waters having pH adjusted to 1, 2, 3, 5, 8, 10 and 12, respectively. Then, the adsorbent obtained in Example 2 was pulverized to a powder product passing through a 120-mesh sieve, 300 mg. of which was added to each of the above-mentioned model waste waters. After shaking one day (24 hours), measurements were taken of the concentrations of phosphate ions in the model waste waters to determine the quantities of adsorbed phosphate ions by the adsorbents. The results are shown in Table 2 and FIG. 2.

Figure 2:
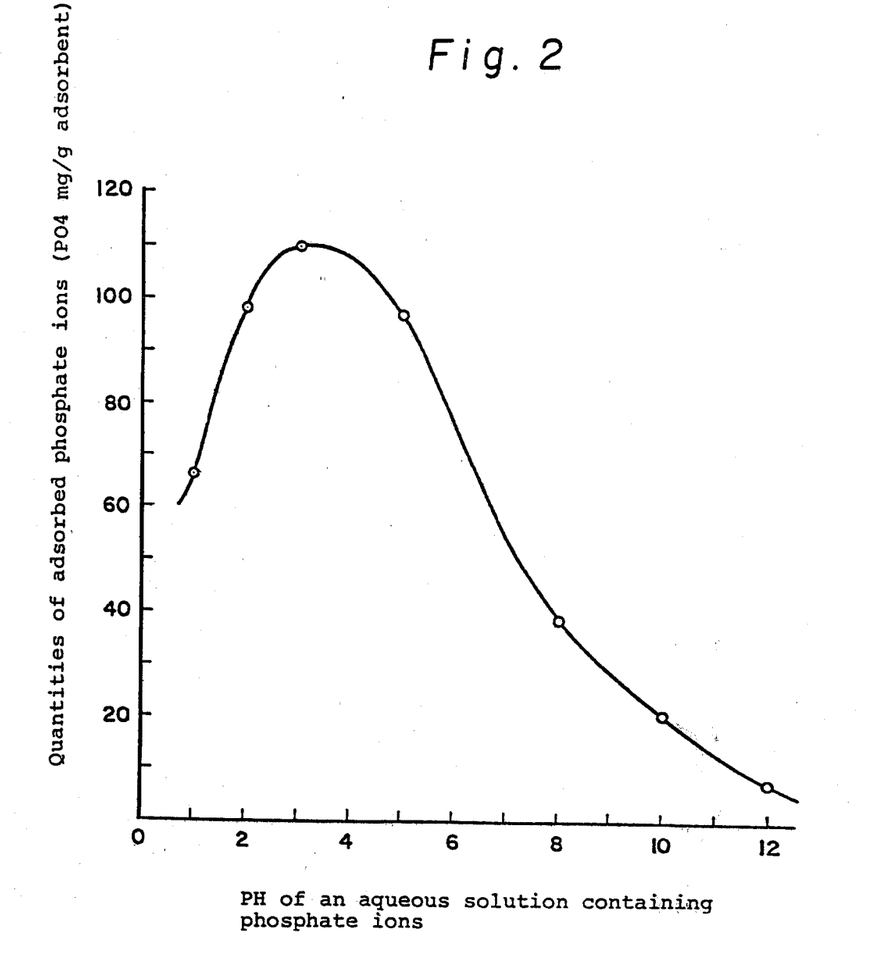

FIG. 2 is pH of an aqueous solution containing phosphate ions as abscissa in relation to quantities of adsorbed phosphate ions by the adsorbent of this Example.

TABLE 4

| PH value of model waste waters | PO4 concentration (mg/l) | | Quantity of adsorbed PO4 (mg./g.) |
| --- | --- | --- | --- |
| | Before adsorption | After adsorption | |
| 1 | 500 | 302 | 66 |
| 2 | 500 | 206 | 98 |
| 3 | 500 | 170 | 110 |
| 5 | 500 | 209 | 97 |
| 8 | 500 | 383 | 39 |
| 10 | 500 | 437 | 21 |
| 12 | 500 | 476 | 8 |

As may be obvious from Table 4 and FIG. 2, the adsorbent of this invention is found to adsorb larger quantities of phosphate ions particularly in the pH range of 2 to 5 but adsorb hardly in the alkaline side of pH 10 or above.

EXAMPLE 11

A 1 l portion of a 0.15 mol aqueous solution of titanium tetrachloride was prepared. 7 gr. as Ti of metal ions was contained in the solution. 75.6 gr. of crystals of ferrous sulfate ($FeSO_4.7H_2O$) was added to the aqueous solution and dissolved under stirring. The quantity was equivalent to 0.27 mole as ferrous iron ions. Then, the aqueous solution was warmed at 60° to 70° C. to add dropwise a 15% sodium hydroxide solution under stirring, whereby there was produced a blue-green precipitate. The drop-wise addition was continued until pH of the aqueous solution reached 10. In the nexe place, air was blown into the aqueous solution at a flow rate of 10 l/hour, while warming it at 60° to 70° C. Continued air blowing resulted in a decrease in pH of the aqueous solution and, in such case, pH was maintained at 10 by adding a 15% sodium hydroxide solution. Air was blown for about 2 hours to produce a black-colored precipitate of a mixture of hydrated ferrite and hydrated oxide of titanium. The black precipitate was filtered off by suction, and washed with deionized water until the filtrate became neutral, followed by drying at not higher than 70° C. The precipitate was pulverized to not larger than 20 microns in a mortar to obtain a mixture of hydrated ferrite of titanium and a metal oxide hydrate in a powdery form. 20 gr. of the powdered mixture (consisting of 97.2% of hydrated ferrite of titanium and 2.8% of hydrated oxide of titanium) of hydrated ferrite and hydrated oxide of titanium was weighed out in a beaker, to which 20 gr. of the unsaturated polyester resin used in Example 1 was added to stir and mix adequately with a stirring rod. Then, 0.1 gr. of cobalt naphthenate and 0.2 gr. of methyl ethyl ketone peroxide were added and mixed adequately to allow the resin to cure. The curing time was about 30 to 60 minutes. Thereafter, the solid mass was taken out of the beaker, pulverized to a suitable size and sieved to 24 to 80 mesh to thereby obtain an adsorbent.

EXAMPLE 12

A 1 l portion of a 0.05 mol aqueous solution of zirconium oxychloride was prepared. 4.55 gr. as Zr of metal ions was contained in the solution, 25 gr. of crystals of ferrous sulfate ($FeSO_4.7H_2O$) was added to the aqueous solution and dissolved under stirring. The quantity was equivalent to 0.09 mol as iron ions. Then, a 15% sodium hydroxide solution was added dropwise to the aqueous solution under stirring until pH of the solution reached 10, whereby there was produced a blue-green precipitate. Air was blown into the aqueous solution at a flow rate of 10 l/hour, while warming it at 50° to 80° C. Continued air blowing resulted in a decrease in pH of the aqueous solution and, in such case, pH was maintained at 10 by adding dropwise a 15% sodium hydroxide solution. Air was continued to be blown until there was no decrease observed in pH, whereby there was produced a black-colored precipitate of a mixture of hydrated ferrite and hydrated oxide of zirconium. The black precipitate was filtered out by suction and washed with deionized water until the filtrate became neutral, followed by drying at a temperature of not higher than 50° C. The precipitate was pulverized to not larger than 120 microns in a mortar to thereby obtain a powdered mixture of hydrated ferrite of zirconium and hydrated oxide of zirconium, with a 95% content of hydrated ferrite of zirconium. 10 gr. of the powder was weighed out in a beaker. Subsequently, by the same procedure as in Example 11, 10 gr. of the unsaturated polyester resin used in Example 1 was mixed and allowed to cure to thereby obtain an adsorbent.

EXAMPLE 13

A 14 gr. portion of the powdered mixture of hydrated ferrite of zirconium and hydrated oxide of zirconium, as prepared by the same procedure as in Example 12, was weighed out in a beaker. Subsequently, by the same procedure as in Example 11, 6 gr. of the unsaturated polyester resin used in Example 1, together with 0.03 gr. of cobalt naphthenate and 0.06 gr. of methyl ethyl ketone peroxide, was added, stirred and mixed adequately, and allowed to stand to permit curing within about 60 minutes. The cured mass was pulverized to a suitable particle size and sieved to 8 to 80 mesh to obtain an adsorbent.

EXAMPLE 14

By the same procedure as in Example 12, there was obtained 16 gr. of a powdered mixture (95 weight % of a content of hydrated ferrite) of hydrated ferrite of zirconium and hydrated oxide of zirconium. Seven grams of the unsaturated polyester resin used in Example 5 was added to the powder, and stirred and mixed adequately, followed by adding 0.035 gr. of a 1% cobalt naphthenate solution, 0.07 gr. of methyl ethyl ketone peroxide and further 0.007 gr. of dimethylaniline and mixing adequately under a stream of nitrogen gas to thus effect curing. A curing time was 30 to 60 minutes. The solid mass obtained in this manner was pulverized and sieved to obtain an adsorbent of 8 to 80 mesh.

EXAMPLE 15

By the same procedure as in Example 12, there was obtained 16 gr. of a mixture (95% of a content of hydrated ferrite) of hydrated ferrite of zirconium and hydrated oxide of zirconium. 10 ml (about 10 gr.) of a hydrophilic urethane prepolymer (a hydrophilic polyether polyol of a copolymer from ethylene oxide and propylene oxide being added with tolylenediisocyanate at its terminals) was added dropwise under stirring, while suspending the powder in 10 ml of water. The reaction of the hydrophilic urethane prepolymer with water began to take place immediately, thus affording a foaming gel of a polyurethane resin under evolution of carbonic acid gas. The powdered mixture of hydrated ferrite of zirconium and hydrated oxide of zirconium was suspended and held in the gel. The gel was cut to a suitable size to obtain an adsorbent.

EXAMPLE 16

A 5 ml portion of a 0.5 mol aqueous solution of zirconium sulfate was prepared. The solution was divided into five equal parts to place each 1 l in a beaker. The beakers were designated as A, B, C, D and E, respectively. Each beaker contained 45.5 gr. as Zr of metal ions. Crystals of ferrous sulfate ($FeSO_4.7H_2O$) of the following quantities were added in the beakers; 556 gr. in beaker A, 278 gr. in B, 136 gr. in C, 91.7 gr. in D and 34.8 gr. in E. The crystals were dissolved under stirring. Then, the beakers were transferred into a water bath and heated at 70° C., followed by adding dropwise a 15 weight % aqueous sodium hydroxide solution under stirring to each of the beakers until pH value reached 9, whereby the inner temperature of the beaker was maintained at 70° C. A blue-green precipitate was produced in each of the beakers with increasing pH value and turned into a black-brown one, when pH increased further. For each of the beakers, the addition of the alkali was stopped at the time when pH reached 9, and air was blown at a flow rate of 10 l/hour, while maintaining the inner temperature at 70° C. and continuing to stir. Continued air blowing reduced somewhat pH in each of the beakers and, in such case, pH was maintained at 10 by adding dropwise a 15% sodium hydroxide solution. Air was continued to be blown until there was no decrease observed in pH, whereby there was produced a black to black-gray precipitate of a mixture of hydrated ferrite of zirconium and hydrated oxide of zirconium in each of the beakers. Then, the precipitates, respectively, were filtered off by suction, washed with deionized water until the filtrates became neutral, and dried at not higher than 50° C. They were pulverized to not larger than 120 microns in a mortar to obtain five kinds of powders.

The compositions of five kinds of powders were as follows.

|   | Content of hydrated ferrite | Content of hydrated oxide |
|---|---|---|
| A | 45.6% | 54.4% |
| B | 100% | 0% |
| C | 68.6% | 31.4% |
| D | 41.7% | 58.3% |
| E | 23.5% | 76.5% |

Then, 30 gr. each of five kinds of the powders were weighed out in beakers. By the same procedure as in Example 11, 10 gr. of the unsaturated polyester resin used in Example 1 together with 40 mg. of cobalt naphthenate and 80 mg. of methyl ethyl ketone peroxide, was added in each of the beakers to stir and mix adequately. The mixtures, upon standing, cured. The cured masses were pulverized to a suitable size and sieved to 24 to 80 mesh to obtain five kinds of adsorbents, A, B, C, D and E.

EXAMPLE 17

A 0.2 gr. portion of each of five kinds of the powdered adsorbents as obtained in Example 16 was added to 100 ml (pH=3) each of model waste waters containing 500 ppm of phosphate ions prepared by use of sodium hydrogenphosphate. After shaking the mixtures one day (24 hours), the concentrations of phosphate ions in the model waste waters were measured to determine the quantities of adsorbed phsosphate ions by the adsorbents. The results are shown in Table 5.

TABLE 5

| Designation of adsorbents | Equilibrium adsorption quantity at 100 mg./l of $PO_4$ equilibrium concentration, mg. $PO_4$/gr.-adsorbent |
|---|---|
| A | 94 |
| B | 110 |
| C | 112 |
| D | 111 |
| E | 105 |

EXAMPLE 18

The adsorbent B as obtained by the same procedure as in Example 16 was pulverized and sieved to 24 to 80 mesh, and 100 ml was packed into a column of 25 mm $\phi$ in inner diameter, through which the model waste water (as adjusted to pH 4.5 with dilute sulfuric acid) containing 1,000 ppm of phosphate ions as prepared by the use of sodium hydrogenphosphate was passed at a flow rate of SV=5 (l/hr).

A sample was taken from the effluent solution from the column after 12 hours to measure the phosphate ion concentration. After sampling of the effluent, 200 ml of a 10% aqueous solution of sodium hydroxide was passed through the column at a flow rate of SV=2 (l/hr). It was found that about 94% of adsorbed phosphate ions was desorbed.

100 ml of water was passed through at a flow rate of SV=2 (l/hr) to wash away the column. Then, 500 ml of a sulfuric acid solution having pH adjusted to 2 was passed and circulated through the column at a rate of $SV = 10$ (l/hr) until pH of the effluent from the column became 2 and then, the model waste water containing 1,000 ppm of phosphate ions was passed through the column at a flow rate of $SV = 5$ (l/hr). In this manner, the repeated use was continued. The results are shown in Table 6.

TABLE 6

| Number of repeated passing through (times) | C/Co |
|---|---|
| 1 | 0.04 |
| 20 | 0.02 |
| 40 | 0.03 |
| 60 | 0.02 |
| 80 | 0.05 |
| 100 | 0.02 |
| 120 | 0.04 |

Note:
Co: The initial phosphate ions concentration in the model waste water (mg/l)
C: The phosphate ions concentration in the effluent after 12 hours (passing-through) (mg/l)

EXAMPLE 19

The adsorbent B as obtained by the same procedure as in Example 16 was pulverized and sieved to 24 to 80 mesh, and about 4 kg. of so pulverized matter was packed into a column of 200 mm $\phi$ in inner diameter until the height reached 1.6 m.

An aqueous solution containing about 109 mg/l of phosphate ions was passed through the column at a flow rate of 158 l/hr ($SV = 3.16$ (l/hr)) until it was broken through (the breaking through point: 11 mg./l). The adsorbent was found to adsorb $PO_4^{-3}$ of about 37 g. per kg. of the adsorbent up to the breaking-through.

100 l of a 15% aqueous solution of sodium hydroxide was made to flow through the used adsorbent at a flow rate of $SV = 1$ (l/hr), followed by washing the adsorbent with 100 l of water, thereby yielding about 160 ml of the effluent. The effluent contained 16,300 mg/l of phosphate ions. This value was converted to a sodium phosphate concentration of about 3.4%, along with a sodium hydroxide concentration of about 7.5%.

Then, 16.0 kg. of sodium hydroxide as a dry solid was charged for dissolution in the aqueous solution of sodium hydroxide containing sodium phosphate, which, upon cooling down to room temperature, separated out crystals of sodium phosphate. The crystals were collected by filtration and found to weigh 6.67 kg. On the other hand, the concentrations of sodium hydroxide and $PO_4^{-3}$ in the resulting mother liquor were respectively 15.3% and 0.47%. And, the recovery rate of $PO_4^{-3}$ was about 70%.

What is claimed is:

1. An adsorbent, which has been prepared by mixing (a) one part by weight of (i) at least one member selected from the group consisting of hydrated ferrites of titanium, zirconium and tin or (ii) a mixture of the said hydrated ferrites and at least one member selected from the group consisting of hydrated oxides of titanium, zirconium, tin and iron with (b) about 1/10 to 3 parts by weight of an unsaturated polyester or polyurethane, followed by curing.

2. An adsorbent as claimed in claim 1, wherein the resin content is about 1/5 to 1 part by weight.

3. An adsorbent as claimed in claim 1, wherein the component (ii) is a mixture of hydrated ferrite of zirconium and hydrated oxide of zirconium.

* * * * *